Nov. 11, 1958   L. C. DIXON   2,859,517
FORMICA KNIFE
Filed Oct. 31, 1957

DIRECTION OF RELATIVE MOTION

INVENTOR.
Lewis C. Dixon
BY George Renrhan
ATTORNEY

2,859,517

FORMICA KNIFE

Lewis C. Dixon, Mount Airy, Md.

Application October 31, 1957, Serial No. 693,792

2 Claims. (Cl. 30—317)

(Granted under Title 35, U. S. Code (1952), sec. 266)

The invention described herein may be manufactured and used by or for the Government of the United States of America for governmental purposes without the payment to me of any royalty thereon.

This invention relates to hand tools and particularly to hand tools that will sever relatively hard material such as Formica, linoleum, asphalt tile, asbestos shingles and the like.

Heretofore, the severing of hard material has presented problems to the craftsman who requires a fast and neat severance. Many tools have been in use but they are generally either unwieldy or they simply cannot perform the entire operation satisfactorily for the careful artisan. It is known that there are power driven tools designed to provide a clean cut; however, this type of tool is awkward to handle or else requires additional steps by the craftsman to walk to the power tool. This results in a loss of efficiency and economy. Other means have been used such as multiple hand tools, but here again time is lost by the necessity of changing from one tool to another.

An object of this invention is to provide a simple, inexpensive tool which will perform a quick, accurate and neat severance in one operation.

Another object of this invention is to provide a tool particularly adapted to be easily carried by a craftsman, whereby the use of a cumbersome power tool is unnecessary.

Another object of this invention is to assure free severing movement of the tool during operation.

Another object is to make it unnecessary for the craftsman to alter the position of his hand on the tool during the operation, or to use another tool.

A full and clear understanding of this invention, as well as the accomplishment of the aforesaid objects, will be had by reference to the following detailed drawing and description.

Figure 1:
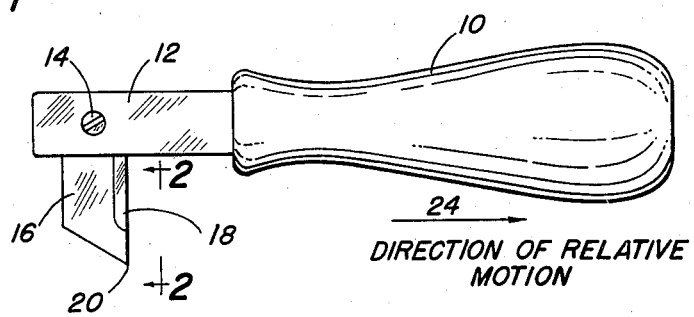
Fig. 1 is a side view of the complete tool in accordance with the invention.
Figure 2:
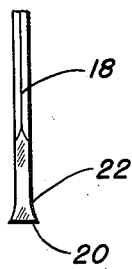
Fig. 2 is an end view of the blade of the invention as viewed from the handle.

Referring to Figs. 1 and 2, the tool shown therein comprises a handle 10 having attached thereto, in any conventional manner well known in the art, a metal blade 16. Generally, the blade 16 may be joined to the handle by means of a blade adapter or shank extending from one end of the handle. The adapter has a suitable screw means 14 for securing the blade 16 to the shank 12. However, it is to be understood that other securing means for the blade may be utilized such as a force fit, clamp means into the adapter, or the blade 16 could be attached directly to the handle in any conventional manner.

The blade 16 is made of suitable material such as hardened steel having a sharp edge 18, which is used for trimming any rough edges. A scraping edge 20 is formed perpendicularly to the longitudinal cutting edge 18, and in the preferred embodiment of the invention is coplanar with the edge 18.

As clearly shown in Fig. 2, the scraping edge 20 is tapered upwardly and inwardly from the thickened portion 22 at the working edge of the blade 16. The tapering of this edge 20 is an important feature of the present invention, since it prevents binding of the edge in a groove formed by its own scraping action.

The shape in elevation of the blade 16 is shown to be trapezoidal; however, it is obvious that other shapes may be used, provided that the scraping edge 20 extends outwardly in an unrestricted manner from the body of the blade.

The blade 16 is situated in the handle in such a manner that the edge 18 as well as the edge 20 are leading edges with respect to the direction of relative motion of the tool as indicated at 24 of Fig. 1.

In operation, the scraping edge 20 cuts a narrow, shallow groove along a preselected line. Several successive strokes may be necessary depending upon the pressure placed upon the tool as well as the hardness and the thickness of the laminated material. As is readily apparent, the shallow grove becomes deeper with additional strokes until the material is completely severed or separated, but the operation may cease after a few strokes, which are sufficient to allow the material to be broken along the groove formed.

The trim blade 18, an essential feature of the present invention, is used to trim the rough edges after the groove is of sufficient depth to allow breaking of the material. Its unique location in relation to the scraping edge 20 allows the craftsman to trim edges of the material in a stroke immediately following the last scraping stroke. The great advantage of this feature is readily apparent, since it precludes the necessity of the time consuming operation of either changing to another tool, or changing the position of the hand. When it is realized that the craftsman may use this novel tool several hundred times a day, the savings in time are considerable, resulting in greater efficiency and economy.

The handle 10 may be made of wood, metal such as steel, aluminum or brass, etc., or any of the well known thermosetting or plastic type synthetic resin materials such as phenolformaldehyde, polystyrene, melamine formaldehyde, dialkyl phthalate rubber, etc. The blade 16 is preferably made of a hardened steel or steel alloy that are generally known in the art.

Although this description sets forth a particular embodiment of the invention, it is obvious that many modifications are possible within the scope of this invention. It is intended that the scope of this invention be solely limited by the appended claims.

I claim:

1. A tool designed for manually severing relatively hard material comprising a handle, a removable substantially flat knife blade securely connected to said handle, said blade being disposed to extend at an angle from said handle which blade comprises at least two substantially parallel surfaces intermediate of which, and parallel thereto, is a longitudinal cutting edge disposed along a portion of the leading edge of the blade which edge extends at an angle to and faces said handle, said cutting edge being located remote from the end of the blade, the remote end of the blade being provided with a thickened portion which includes a scraping edge extending the thickness of the blade.

2. The hand tool of claim 1 wherein the blade extends perpendicularly to said handle and wherein both the cutting edge and the scraping edge lie in a common plane substantially perpendicular to said surfaces and said handle.

References Cited in the file of this patent

UNITED STATES PATENTS

| D. 32,481 | Berger | Apr. 10, 1900 |
| 1,975,357 | Dunn | Oct. 2, 1934 |
| 2,348,429 | Walker | May 9, 1944 |
| 2,658,143 | Baker | Nov. 17, 1953 |

UNITED STATES PATENT OFFICE

CERTIFICATE OF CORRECTION

Patent No. 2,859,517                                November 11, 1958

Lewis C. Dixon

It is hereby certified that error appears in the above numbered patent requiring correction and that the said Letters Patent should read as corrected below.

In the heading to the sheet of drawings, comprising figures 1 and 2, line 2 thereof, and in the heading to the printed specification, line 2, for the title, "FORMICA KNIFE" read -- KNIFE --; in the printed specification, column 1, line 16, for "Formica," read -- Formica laminated plastic, --.

Signed and sealed this 10th day of March 1959.

(SEAL)

Attest:
KARL H. AXLINE

Attesting Officer

ROBERT C. WATSON
Commissioner of Patents